(12) United States Patent
Brown

(10) Patent No.: US 11,788,576 B2
(45) Date of Patent: Oct. 17, 2023

(54) QUICK-DISCONNECT BALL AND SOCKET JOINT

(71) Applicant: The United States of America as represented by the Secretary of the Navy, San Diego, CA (US)

(72) Inventor: Michael H. Brown, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 797 days.

(21) Appl. No.: 16/737,763

(22) Filed: Jan. 8, 2020

(65) Prior Publication Data

US 2021/0207649 A1 Jul. 8, 2021

(51) Int. Cl.
*F16C 11/06* (2006.01)
*F16G 11/03* (2006.01)
*F16G 11/10* (2006.01)
*F16B 21/18* (2006.01)
*A01K 27/00* (2006.01)

(52) U.S. Cl.
CPC .......... *F16C 11/069* (2013.01); *A01K 27/003* (2013.01); *F16B 21/183* (2013.01); *F16G 11/03* (2013.01); *F16G 11/108* (2013.01)

(58) Field of Classification Search
CPC ........ F16B 21/16; F16B 21/18; F16B 21/183; F16C 11/069; F16G 11/03; F16G 11/10; F16G 11/108; Y10T 403/587; B63B 2021/203; B63G 8/42; A01K 27/003
See application file for complete search history.

(56) References Cited

U.S. PATENT DOCUMENTS

| | | | |
|---|---|---|---|
| 3,100,121 A | 8/1963 | Hillmer | |
| 3,204,991 A | 9/1965 | Hauk | |
| 3,287,032 A | 11/1966 | Kraybill | |
| 3,455,579 A | 7/1969 | Oliff | |
| 3,757,722 A * | 9/1973 | Seiple | B63B 22/02 114/322 |
| 4,177,530 A * | 12/1979 | Swenson | B63B 22/18 367/14 |
| 4,637,548 A | 1/1987 | Ray | |
| 6,918,618 B2 | 7/2005 | Allouche | |

(Continued)

*Primary Examiner* — Michael P Ferguson
*Assistant Examiner* — Kevin J Baynes
(74) *Attorney, Agent, or Firm* — Naval Information Warfare Center, Pacific; Kyle Eppele; Matthew D. Pangallo

(57) ABSTRACT

A quick-disconnect ball and socket joint includes a substantially spherical strain relief node configured to be coupled to an object, such as a cable. The system further comprises an end cap configured to capture the substantially spherical strain relief node, the end cap having a diameter that permits the substantially spherical strain relief node to pass therethrough when the system is in an open position. The system still further comprises a retaining element configured to retain the substantially spherical strain relief node in the end cap. The retaining element is attached to the end cap when the system is in a closed position and the object is prevented from being removed from capture by the end cap. However, in the open position, the retaining element may be removed from capture by the end cap by passing the substantially spherical strain relief node through a diameter of the end cap.

7 Claims, 5 Drawing Sheets

(56) References Cited

U.S. PATENT DOCUMENTS

| | | | |
|---|---|---|---|
| 7,481,464 B2 | 1/2009 | Füsser | |
| 8,371,015 B2 * | 2/2013 | Campbell | F16G 11/048 29/863 |
| 8,485,706 B2 * | 7/2013 | Chien | B60Q 1/076 403/315 |
| 9,835,228 B2 * | 12/2017 | Campbell | F16G 11/03 |
| 10,451,504 B2 * | 10/2019 | Campbell | G01L 5/103 |
| 2018/0162724 A1 | 6/2018 | Tripathi | |

* cited by examiner

QUICK-DISCONNECT BALL AND SOCKET JOINT

STATEMENT OF GOVERNMENT INTEREST

Federally-Sponsored Research and Development

The United States Government has ownership rights in this invention. Licensing inquiries may be directed to Office of Research and Technical Applications, Naval Information Warfare Center, Pacific, Code 72120, San Diego, CA, 92152; telephone (619)553-5118; email: ssc_pac_t2@navy.mil. Reference Navy Case No. 104,083.

BACKGROUND OF THE INVENTION

Field of Invention

This disclosure relates to connectors and, more particularly, to cable connectors.

Description of Related Art

It may be desirable to have connectors that are strain-relieved, so that if they are pulled on, the connectors do not break. Connecting cables to pressurized housings with effective strain relief can be complicated and unreliable. Prior art system and methods for connecting such cables often do not allow for the natural movement present in undersea applications with tidal, wind or wave action.

A previous method of connecting such cables included creating slack in the cable of interest. Then, that method included using a separate line attached by means of a cable sock, i.e., compression binding, to the cable of interest to take the strain. Additionally, to protect the pressure connectors, these cables must pass through an end cap, which can be difficult to remove, making servicing and unplugging cables aboard a rolling ship extremely challenging.

Various connectors have been used for various purposes. For example, in U.S. Pat. No. 3,100,121 to Hillmer, he describes a joint lock ring for thin-walled cylinders. The locking ring or Hillmer joint is shown in FIG. 1. However, the Hillmer joint is not designed to connect objects such as cables to other objects. U.S. Pat. No. 3,100,121 to Hillmer is herein incorporated by reference.

The locking ring 23 is shown in its entirety in FIG. 1 and comprises two identical parts 23a, 23b which are rolled or otherwise formed to circular shape to conform to the circular shape of the mating groove. Each part tapers in width from a width W at one end to a smaller width w at its other end, the sum of the widths at all points about the periphery being the same and thus producing a rectangular cross section of constant thickness equal to the combined radial depths of the mating groove but of variable width depending upon the angular relationship of the two parts. The narrow end of each part is provided with gear teeth 27, and the opposite end of each part is provided with threaded aperture 34.

There is a need for a system and method for connecting two items, e.g., cables to other items, that do not have the drawbacks and incompatibilities described above.

BRIEF SUMMARY OF INVENTION

The present disclosure provides a quick-disconnect ball and socket joint system and method. In accordance with one embodiment of the present disclosure, the quick-disconnect ball and socket joint system comprises a substantially spherical strain relief node that is configured to be coupled to an object. The system further comprises an end cap configured to capture the substantially spherical strain relief node, the end cap having a diameter that permits the substantially spherical strain relief node to pass therethrough when the system is in an open position.

The system still further comprises a retaining element configured to retain the substantially spherical strain relief node in the end cap. The retaining element is attached to the end cap when the system is in an open position.

When the system is in the closed position, the object is prevented from being removed from capture by the end cap. However, in the open position, the retaining element is configured to permit the object to be removed from capture by the end cap by passing the substantially spherical strain relief node through a diameter of the end cap.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of the quick-disconnect ball and socket joint. In the drawings.

DETAILED DESCRIPTION OF THE INVENTION

Disclosed herein is a system and method for connecting two objects, such as a cable and a second object. Even if the cable is pulled on, the cable remains connected to the object. Thus, the electrical continuity of a cable system may be maintained, even if the cable is pulled on. The system and method described herein provides a strain relief node potted onto the cable of interest as well as a Hillmer-style joint, creating a flexible strain-relieved system. Typically, ball and socket joints are not easy to disconnect. The present system and method provide an easily disconnected ball and socket joint that is easily serviceable but also flexible and strong. The present system and method are also suitable for oceanographic or underwater applications where corrosion may be a factor.

The system and method incorporate three main parts. The first is a substantially spherical strain relief node. An object, such as a cable, may be coupled to the substantially spherical strain relief node. Second, the system and method incorporate an end cap configured to capture the substantially spherical strain relief node. The end cap has a diameter that permits the substantially spherical strain relief node to pass therethrough when the ball and socket joint system is in an open position. Third, the system and method incorporate a retaining element configured to retain the substantially spherical strain relief node in the end cap.

When the quick-disconnect ball and socket joint system is in the closed or locked position, the cable is prevented from being removed from capture by the end cap. The retaining element is attached to the end cap when the system is in a closed position. When the quick-disconnect ball and socket joint system is in the open position, the retaining element is configured to permit the object to be removed from capture by the end cap by passing the substantially spherical strain relief node through a diameter of the end cap.

Figure 1:
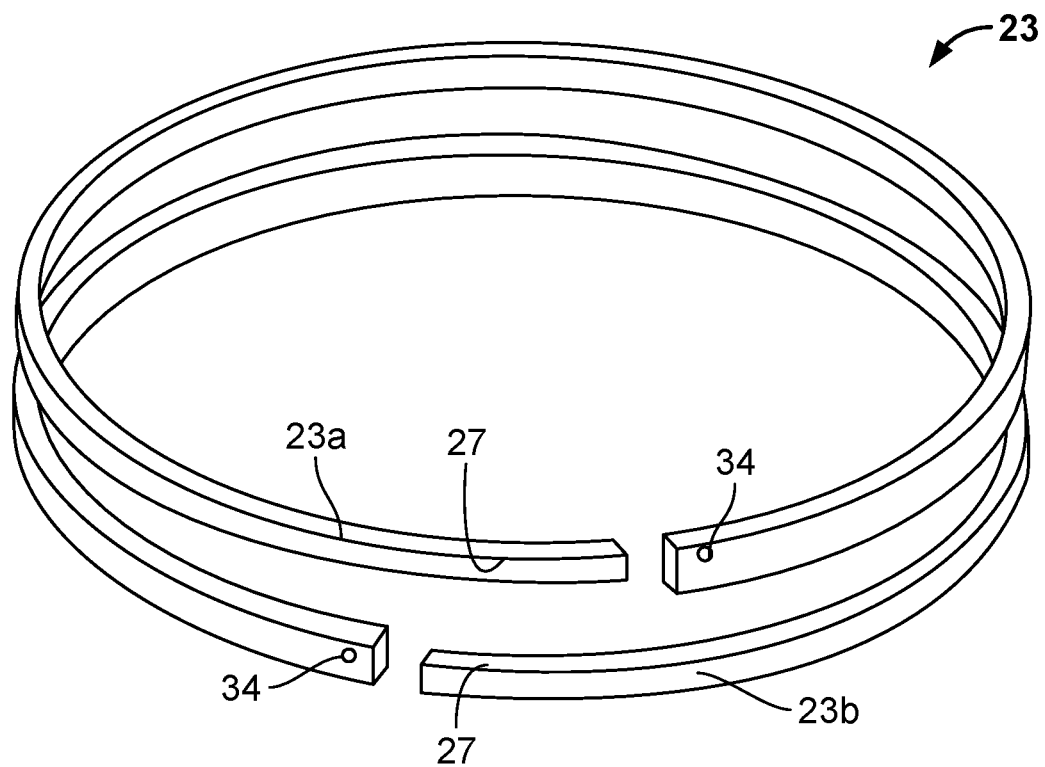
FIG. 1 is a prior art Hillmer joint used to join thin-walled cylinders.
Figure 2A:
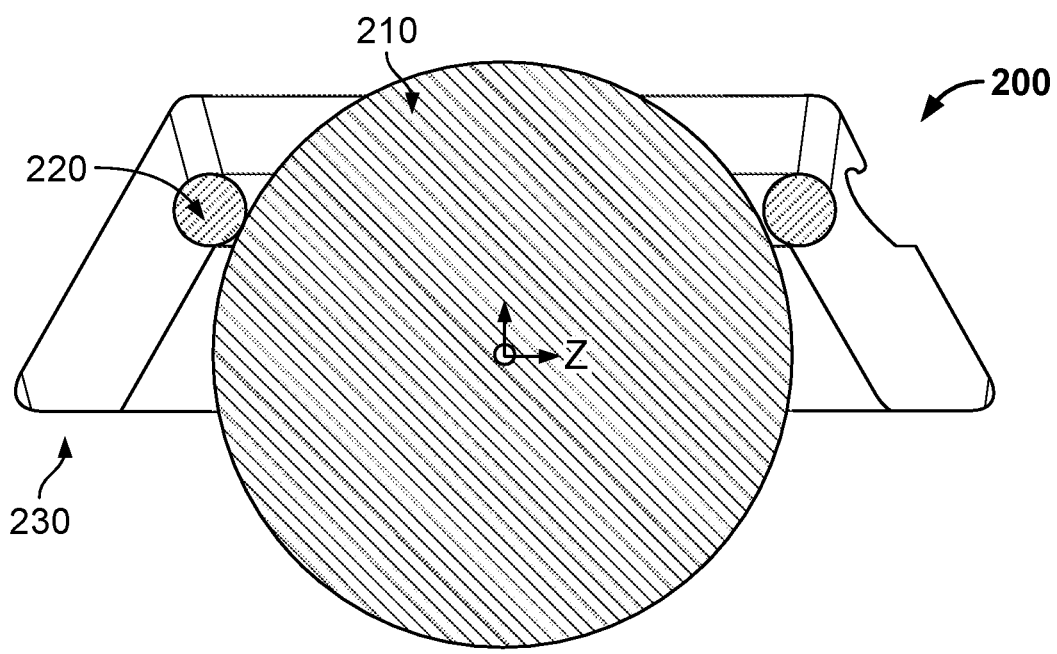
FIG. 2A is a front cross-sectional view of a quick-disconnect ball and socket joint system in accordance with one embodiment of the present disclosure.
Figure 2C:
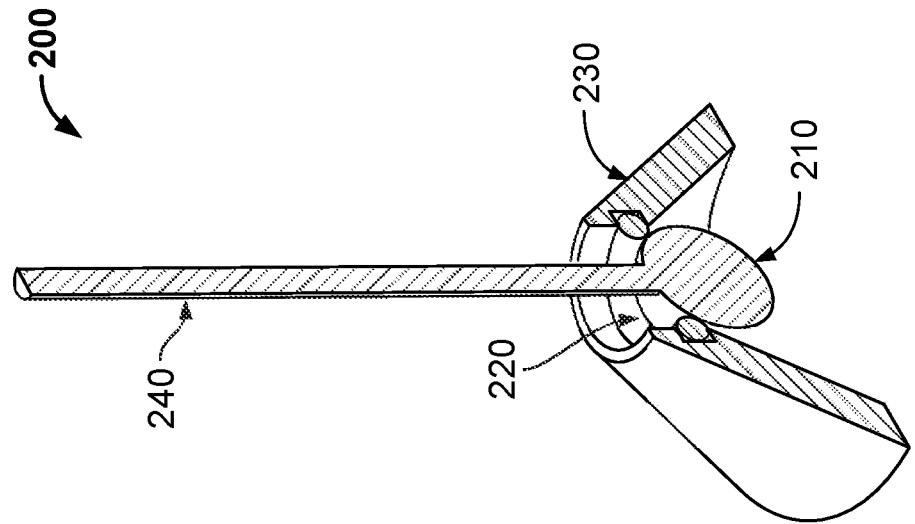
FIG. 2C is a side cross-sectional view of a quick-disconnect ball and socket joint system in accordance with one embodiment of the present disclosure.
Figure 2B:
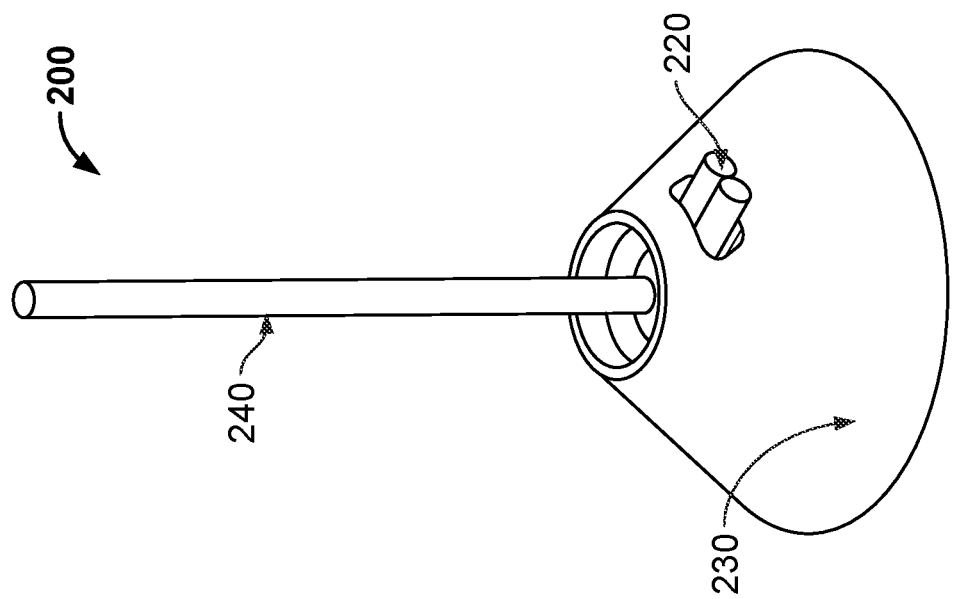
FIG. 2B is a side view of a quick-disconnect ball and socket joint system in accordance with one embodiment of the present disclosure.

Referring now to FIGS. 2A-2C together, illustrated is a front cross-sectional view, a side view and a side cross-sectional view, respectively, of a quick-disconnect ball and socket joint system in accordance with an embodiment of the present disclosure. As shown, the system 200 includes a substantially spherical strain relief node 210. The system 200 also includes a retaining element 220 configured to retain the substantially spherical strain relief node 210 in an end cap 230. The retaining element 220 is attached to the end cap 230 when the system 200 is in a closed position. The end cap 230 is configured to capture the substantially spherical strain relief node 210 when the system is in the closed position. The end cap 230 has a diameter (d) that permits the substantially spherical strain relief node 210 to pass therethrough when the system 200 is in an open position. An object 240, such as a cable, may be attached to the strain relief node 210.

In FIGS. 2A-2C, the system 200 is shown in a closed position. An object 240, such as a cable attached to the substantially spherical strain relief node, is prevented from being removed from capture by the end cap 230 when the system 200 is in the closed position. Substantially spherical strain relief node 210 may be potted onto the object 240 for further protection of the integrity of the electrical wiring in the object 240 in order to insulate the electronics from environmental damage, such as water damage. As for potting, the substantially spherical strain relief node 210 and object 240 may be placed together in a mold. A castable urethane or rubber or other plastic may be poured over the substantially spherical strain relief node 210 and object. The rubber or plastic may then harden and create a shell around the electronics so that water cannot penetrate the substantially spherical strain relief node 210 and object 240.

If the system 200 were in an open position (not shown), the retaining element 220 is configured to permit the object, such as a cable, to be removed from capture by the end cap 230 by passing the substantially spherical strain relief node 210 through a diameter (d) of the end cap 230. The end cap 230 may open or expand in order to accommodate this passing. Each of the elements of system 200 may be composed of a corrosion-resistant, pressure-tolerant material so that it may be used in underwater environments, including lakes, ponds, seas, oceans and other underwater environments.

Figure 3A:
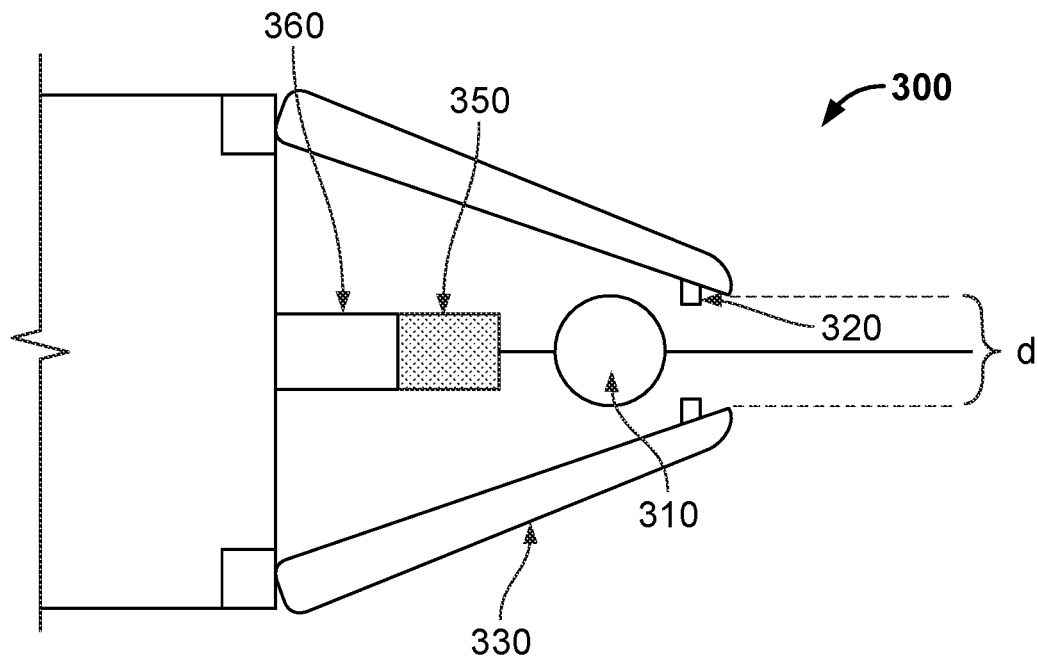
FIG. 3A is an illustration of a quick disconnect ball and socket joint system in a locked or closed position with a retaining ring in accordance with another embodiment of the present disclosure.
Figure 3B:
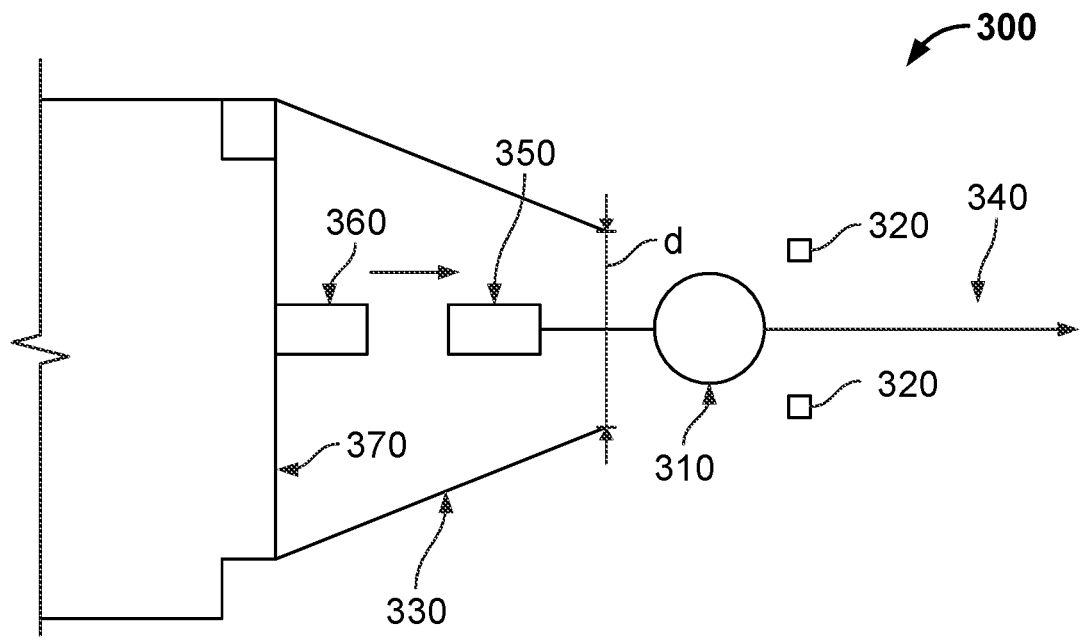
FIG. 3B is an illustration of a quick disconnect ball and socket joint system in an unlocked or open position with a retaining ring in accordance with another embodiment of the present disclosure.

Referring now to FIGS. 3A and 3B, illustrated is a quick-disconnect ball and socket joint system in accordance with one embodiment of the present disclosure. In FIG. 3A, the system 300 is in a locked or closed position, while in FIG. 3B, the system 300 is in an unlocked or open position. The strain relief node 310 is substantially spherical. Retaining element 320, which may be a retaining ring, is used to retain the substantially spherical strain relief node 310 in its place until the substantially spherical strain relief node 310 is released through an unlocking of the retaining element 320 and the end cap 330. When the system 300 is locked or in a closed position, the retaining element 320 prevents the substantially spherical strain relief node 310 from being removed from capture.

Once the retaining element 320, such as a retaining ring, is inserted, the object 340, such as a cable that was captured in the end cap 330, cannot be retracted. This ensures that the connection between the first connector 350 and second connector 360 is secure. The quick-disconnect ball and socket joint system 300 is designed to provide a tight connection that is not only easily serviceable but also flexible. Because of the way the strain relief node 310 rotates, the object 340 can be pulled on, and angled in a certain direction but the connection doesn't see any strain because of the load of the object 340.

When the retaining element 320 is extracted, the object 340 can be unplugged and removed from the end cap 330 by passing the substantially spherical strain relief node 310 through the end cap 330. The end cap 330 has a diameter that permits the substantially spherical strain relief node 310 to pass therethrough when the system 300 is in an open position.

The substantially spherical strain relief node 310 is configured to be coupled to the first connector 350. The first connector 350 is adjacent to, and in contact with the second connector 360. The second connector 360 is coupled (fixedly or otherwise) to a stationary surface 370 that remains stationary on the system 300 regardless of whether the system 300 is in an open position or a closed position. In the open position, the first connector 350 is not in contact with the second connector 360. As a result, the object 340 may be pulled along with the substantially spherical strain relief node 310, which is capable of passing through the diameter of the end cap 330.

Figure 4:
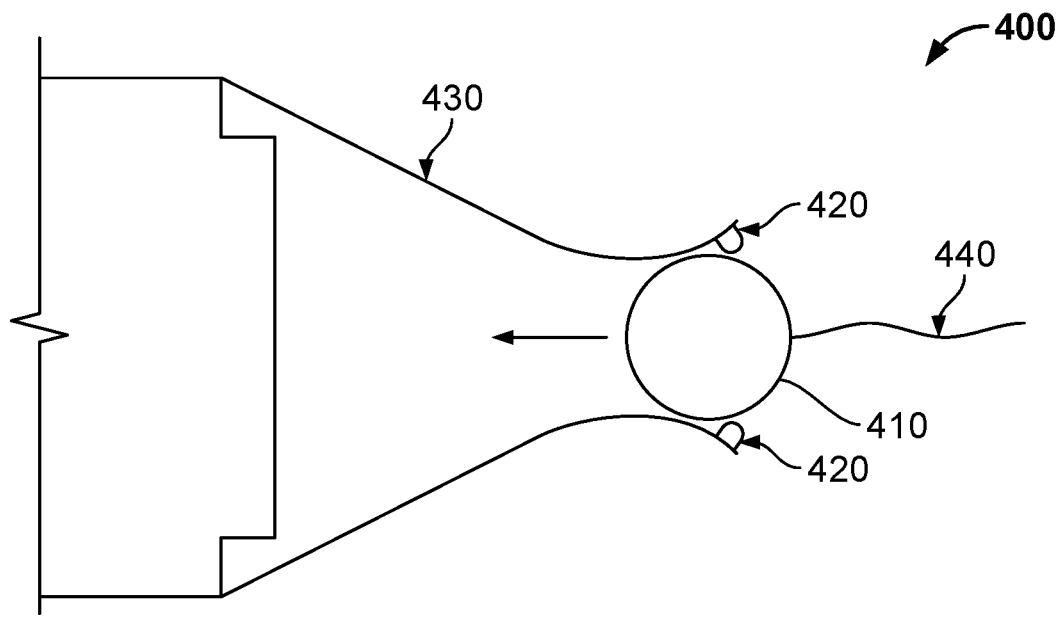
FIG. 4 is an illustration of a quick-disconnect ball and socket joint system with detents in accordance with another embodiment of the present disclosure.

Referring now to FIG. 4, illustrated is another quick-disconnect ball and socket joint system in accordance with another embodiment of the present disclosure. In the present illustration of a deformable design for the quick-disconnect ball and socket joint system, the quick-disconnect ball and socket joint system 400 includes a substantially spherical strain relief node 410, a retaining element 420 and an end cap 430. In the present illustration, the retaining element 420 is one or more detents that deform to permit the substantially spherical strain relief node 410 to pass through a diameter of the end cap 430. The substantially spherical strain relief node 410 can be snapped into the end cap 430 past the retaining element 420. In the present illustration, the retaining element 420, or detents, control the strength of the joint.

As with other embodiments of the quick-disconnect ball and socket joint system, the system 400 in FIG. 4 includes an end cap 430 configured to capture the substantially spherical strain relief node 410, the end cap 430 having a diameter (d) that permits the substantially spherical strain relief node 410 to pass therethrough when the system 400 is in an open position. Retaining element 420 is configured to retain the substantially spherical strain relief node 410 in the end cap 430. The retaining element 420 is attached to the end cap 430 when the system 400 is in a closed position.

When the system 400 is in the closed position, the object 440 or other attached item is prevented from being removed from capture by the end cap 430. In the open position, the retaining element 420 is configured to permit the object 440 to be removed from capture by the end cap 430 by passing the substantially spherical strain relief node through a diameter (d) of the end cap 430.

Figure 5:
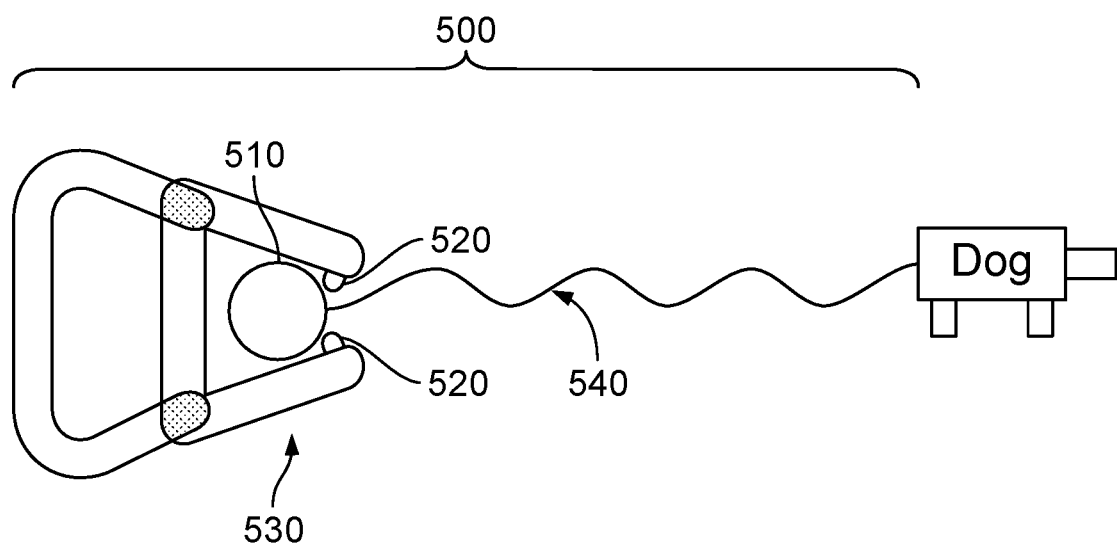
FIG. 5 is an illustration of a quick-disconnect ball and socket joint system for use with a dog leash in accordance with another embodiment of the present disclosure.

FIG. 5 is an illustration of a quick-disconnect ball and socket joint system for use with a dog leash in accordance with another embodiment of the present disclosure. As shown in FIG. 5, the system 500 includes a substantially spherical strain relief node 510, a retaining element 520 and an end cap 530. In the present case, the object 540 is a cable that forms part of a dog leash.

End cap 530 is configured to capture the substantially spherical strain relief node 510, the end cap 530 having a diameter that permits the substantially spherical strain relief node 510 to pass therethrough when the system 500 is in an open position, as shown. Retaining element 520 is configured to retain the substantially spherical strain relief node 510 in the end cap 530. The retaining element 520 is attached to the end cap 530 when the system is in an open position. When the system 500 is in the closed position as shown, the object 540 is prevented from being removed from capture by the end cap 530. When the system 500 is in the open position, the retaining element 520 is configured to permit the object 540 to be removed from capture by the end cap 530 by passing the substantially spherical strain relief node 510 through a diameter of the end cap 530.

Figure 6:
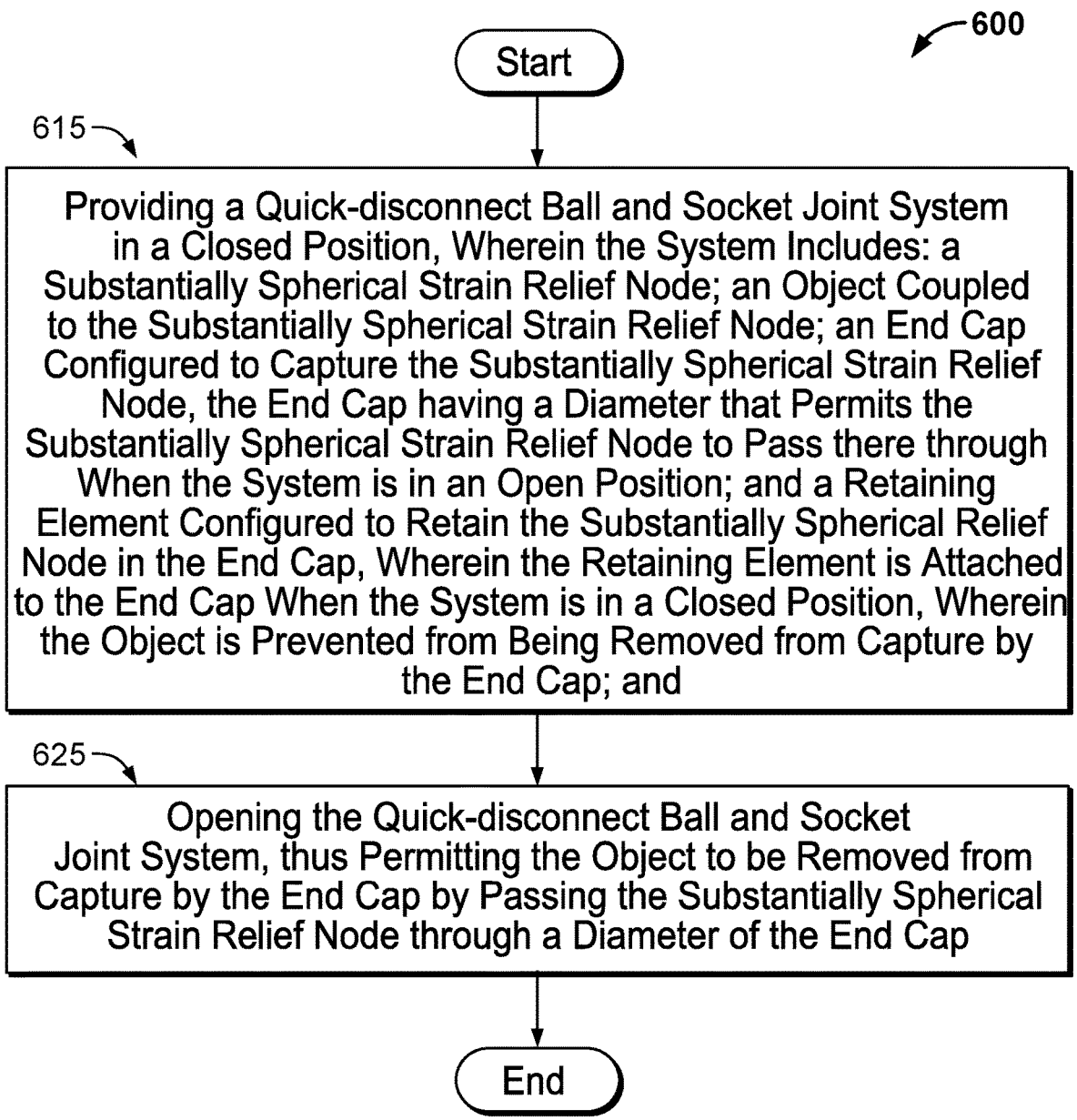
FIG. 6 is an illustration of a quick-disconnect ball and socket joint method in accordance with one embodiment of the present disclosure.

FIG. 6 is an illustration of a quick-disconnect ball and socket joint method in accordance with one embodiment of the present disclosure. The method 600 includes, at step 615, providing a quick-disconnect ball and socket joint system in a closed position. The system includes: a substantially spherical strain relief node; an object coupled to the substantially spherical strain relief node; an end cap configured to capture the substantially spherical strain relief node, the end cap having a diameter that permits the substantially spherical strain relief node to pass therethrough when the system is in an open position; and a retaining element configured to retain the substantially spherical strain relief node in the end cap, wherein the retaining element is attached to the end cap when the system is in a closed position, wherein the object is prevented from being removed from capture by the end cap.

At step 625, the method includes opening the quick-disconnect ball and socket joint system, thus permitting the object to be removed from capture by the end cap by passing the substantially spherical strain relief node through a diameter of the end cap.

As described hereinabove, the present system and method are also suitable for oceanographic or underwater applications where corrosion may be a factor. The present system and method may also be used for musical instruments, such as in a concert. A musician may be able to move freely about a stage knowing that even if an instrument's cable is pulled on, strain relief may be provided for the cable so that the electrical wiring is not destroyed. The present system and method may also be used for other applications where it is desirable for a cable to remain plugged in to another object.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States:

1. A ball and socket joint system, comprising:
an end cap comprising a frustoconical sidewall having an inner cavity, wherein the end cap comprises a substantially circular opening at one end thereof having a diameter, wherein the substantially circular opening separates the inner cavity inside the end cap from an exterior outside the end cap, wherein an annular groove is disposed within the inner cavity on an inner surface of the sidewall, and a through hole extends through the side wall and communicates with the annular groove;
a substantially spherical strain relief node coupled to a cable and dimensioned for passage through the substantially circular opening during each transition between an open state and a locked state of the system, wherein the substantially spherical strain relief node is disposed within the inner cavity of the end cap during the locked state of the system, and the substantially spherical strain relief node is disposed in the exterior of the end cap during the open state of the system; and
a retaining ring disposed within the annular groove of the inner cavity of the end cap between the substantially spherical strain relief node and the substantially circular opening during the locked state of the system, wherein the retaining ring prevents passage of the substantially spherical strain relief node through the substantially circular opening in the end cap during the locked state of the system, so that the cable is captured by the end cap;
the retaining ring comprises distal ends that extend out of the through hole, wherein the distal ends of the retaining ring are configured to be pulled apart in opposite directions within the through hole to release the substantially spherical strain relief node from the end cap and transition to the open state of the system;
and wherein the end cap is coupled to a subsea surface of a ship such that the ball and socket joint system allows for natural movement of the cable due to tidal, wind, or wave action.

2. The system of claim 1, wherein the retaining ring includes detents.

3. The system of claim 1, wherein the cable includes electrical wiring.

4. The system of claim 1, wherein the substantially spherical strain relief node is potted onto the cable.

5. The system of claim 1, wherein the substantially spherical strain relief node and the cable are enclosed in a castable urethane or rubber shell.

6. A method of using a ball and socket joint system, comprising:
providing the ball and socket joint system in a closed position underwater, wherein the ball and socket joint system includes:
a substantially spherical strain relief node;

a cable coupled to the substantially spherical strain relief node;

an end cap configured to achieve a captured state of the substantially spherical strain relief node, the end cap comprising a frustoconical sidewall having an inner cavity, the end cap comprising a substantially circular aperture at one end thereof with a diameter that permits the substantially spherical strain relief node to pass therethrough when the ball and socket joint system is in an open position the end cap includes an annular groove within the inner cavity on an inner surface of the sidewall, and a through hole extending through the sidewall of the end cap and communicating with the annular groove; and a retaining ring configured to retain the substantially spherical strain relief node in the end cap, wherein the retaining ring is attached to the end cap when the ball and socket joint system is in a closed position, the retaining ring disposed within the annular groove of the inner cavity in the end cap between the substantially spherical strain relief node and the substantially circular aperture in the end cap, wherein the retaining ring prevents the substantially spherical strain relief node from being removed from the captured state by the end cap when the ball and socket joint system is in the closed position, wherein distal ends of the retaining ring extend out of the through hole; and opening the ball and socket joint system underwater by pulling the distal ends of the retaining ring apart in opposite directions within the through hole, thus permitting the substantially spherical strain relief node to be removed from the captured state by passing the substantially spherical strain relief node through the substantially circular aperture of the end cap; and wherein the end cap is coupled to a subsea surface of a ship such that the ball and socket joint system allows for natural movement of the cable due to tidal, wind, or wave action.

7. The method of claim 6, wherein the retaining ring includes detents.

* * * * *